United States Patent
Kim et al.

(10) Patent No.: US 12,002,952 B2
(45) Date of Patent: Jun. 4, 2024

(54) LITHIUM TRANSITION METAL COMPOSITE OXIDE AS A POSITIVE ELECTRODE ACTIVE MATERIAL FOR RECHARGEABLE LITHIUM SECONDARY BATTERIES

(71) Applicants: UMICORE, Brussels (BE); UMICORE KOREA LTD., Cheonan-si (KR)

(72) Inventors: JiHye Kim, Cheonan-si (KR); Jens Paulsen, Cheonan-si (KR); AReum Park, Cheonan-si (KR); Hee-Sung Gil, Cheonan-si (KR)

(73) Assignees: UMICORE, Brussels (BE); UMICORE KOREA LTD., Cheonan-si (KR)

( * ) Notice: Subject to any disclaimer, the term of this patent is extended or adjusted under 35 U.S.C. 154(b) by 836 days.

(21) Appl. No.: 17/041,266

(22) PCT Filed: Mar. 6, 2019

(86) PCT No.: PCT/EP2019/055545
§ 371 (c)(1),
(2) Date: Sep. 24, 2020

(87) PCT Pub. No.: WO2019/185138
PCT Pub. Date: Oct. 3, 2019

(65) Prior Publication Data
US 2021/0075014 A1   Mar. 11, 2021

(30) Foreign Application Priority Data
Mar. 28, 2018 (EP) .................................... 18164677

(51) Int. Cl.
*H01M 4/525*   (2010.01)
*H01M 4/04*   (2006.01)
(Continued)

(52) U.S. Cl.
CPC ......... *H01M 4/525* (2013.01); *H01M 4/0471* (2013.01); *H01M 4/133* (2013.01);
(Continued)

(58) Field of Classification Search
None
See application file for complete search history.

(56) References Cited

U.S. PATENT DOCUMENTS

2006/0233696 A1   10/2006   Paulsen et al.
2012/0319037 A1   12/2012   Kawahashi et al.
(Continued)

FOREIGN PATENT DOCUMENTS

EP   2993718 A1   3/2016
JP   2013535771 A   9/2013
(Continued)

OTHER PUBLICATIONS

ISA/EP; International Search Report and Written Opinion for International Patent Application No. PCT/EP2019/055545 dated Apr. 25, 2019, 10 pages.
(Continued)

*Primary Examiner* — Wyatt P McConnell
(74) *Attorney, Agent, or Firm* — NK Patent Law (57) ABSTRACT

A powderous positive electrode material for lithium ion batteries, comprising crystalline lithium transition metal-based oxide particles having a general formula $Li_{1+a}((Ni_z(Ni_{0.5}Mn_{0.5})_y Co_x)_{1-k} A_k)_{1-a} O_2$, wherein A is a dopant, $-0.030 \leq a \leq 0.025$, $0.10 \leq x \leq 0.40$, $0.25 \leq z \leq 0.52$, $x+y+z=1$ and $k \leq 0.01$, wherein the crystalline powder has a crystallite size less than 33 nm as determined by the Scherrer equation based on the peak of the (104) plane obtained from the X-ray diffraction pattern using a Cu K α radiation source, and wherein the molar ratio MR(Ni) of Ni versus the total transition metal content in a cross section of a particle is (Continued)

higher in the surface area than in the center area of the particle, as determined by EDS analysis.

9 Claims, 2 Drawing Sheets

(51) Int. Cl.
    *H01M 4/133*     (2010.01)
    *H01M 4/505*     (2010.01)
    *H01M 10/0525*     (2010.01)
    *H01M 4/02*     (2006.01)

(52) U.S. Cl.
    CPC ....... *H01M 4/505* (2013.01); *H01M 10/0525* (2013.01); *H01M 2004/028* (2013.01)

(56) References Cited

U.S. PATENT DOCUMENTS

| | | |
|---|---|---|
| 2013/0168600 A1 | 7/2013 | Niittykoski et al. |
| 2013/0183583 A1 | 7/2013 | Kim et al. |
| 2015/0188136 A1 | 7/2015 | Mori et al. |
| 2016/0126548 A1 | 5/2016 | Schroedle et al. |
| 2017/0237069 A1 | 8/2017 | Takamori et al. |

FOREIGN PATENT DOCUMENTS

| | | |
|---|---|---|
| JP | 2014506220 A | 3/2014 |
| JP | 2015015230 A | 1/2015 |
| JP | 2017154915 A | 9/2017 |
| JP | 2018098174 A | 6/2018 |
| WO | 2014010448 A1 | 1/2014 |
| WO | 2015128722 A1 | 9/2015 |
| WO | 2016060105 A1 | 4/2016 |
| WO | 2016116862 A1 | 7/2016 |
| WO | 2017042654 A1 | 3/2017 |

OTHER PUBLICATIONS

WIPO; International Preliminary Report on Patentability for International Patent Application No. PCT/EP2019/055545 dated Mar. 2, 2020, 12 pages.

Hou, Peiyu, et al. "Design, preparation and properties of core-shelled Li{[Ni$_y$Co$_{1-2y}$Mn$_y$](1-x)}core{[Ni$_{1/2}$Mn$_{1/2}$]x} shellO2 ($0 \leq x \leq 0.3$, $6y+3x-6xy=2$) as high-performance cathode for Li-ion battery", Electrochimica Acta, vol. 133, Apr. 2014, pp. 589-596.

Sun, Yang-Kook, et al., "A Novel Cathode Material with a Concentration-Gradient for High-Energy and Safe Lithium-Ion Batteries", Advanced Functional Materials, vol. 20, No. 3, Feb. 2010, pp. 485-491.

LITHIUM TRANSITION METAL COMPOSITE OXIDE AS A POSITIVE ELECTRODE ACTIVE MATERIAL FOR RECHARGEABLE LITHIUM SECONDARY BATTERIES

CROSS-REFERENCE TO RELATED APPLICATIONS

This application is a U.S. National Stage application of International Patent Application No. PCT/EP2019/055545, filed on Mar. 6, 2019, which claims the benefit of European Patent Application No. 18164677.9, filed on Mar. 28, 2018.

TECHNICAL FIELD AND BACKGROUND

This invention relates to a lithium transition metal oxide material that can be applied as a positive electrode material for rechargeable lithium ion batteries. More particularly, the material have a specific range of composition and crystallite size. The positive electrode material enhances battery performances such as capacity, irreversibility and cycle stability.

Rechargeable lithium ion batteries (LIBs) are currently used for laptops, cell phones, cameras and a variety of other electronic devices due to their high volumetric and gravimetric energy density, and their long cycle life. Rechargeable batteries are also great means to alleviate today's issues like global warming, environmental pollution and human health impacts from the usage of fossil fuels. Furthermore, to meet the need for large batteries for electric vehicles (EVs) and hybrid electric vehicles (HEVs), higher energy density of batteries are required.

Layered oxide materials, especially $LiCoO_2$ (doped or not—hereafter referred to as "LCO"), are generally preferred because of their high theoretical capacity and good thermal stability as a positive electrode material for LIBs. However, because of the high price of cobalt (Co) associated with resource scarcity and environmental problems, alternative positive electrode materials having a stable layered structure and high theoretical capacity have been developed. In the LCO compound, by substituting the Co with other transition metals, lithium nickel cobalt manganese-based oxide (hereafter referred to as "NMC") and lithium nickel cobalt aluminum-based oxide (hereafter referred to as "NCA") have been suggested as alternatives for LIBs.

Un-doped NMC materials can be considered as a solid state solution of $LiCoO_2$, $LiNi_{0.5}Mn_{0.5}O_2$, and $LiNiO_2$, corresponding to the formula $Li[Ni_z(Ni_{0.5}Mn_{0.5})_yCo_x]O_2$. Here "z" is the so-called Ni-excess. For example, in $LiNiO_2$, all Ni would be 3 valent and the Ni-excess is 100%. In $LiNi_{0.5}Mn_{0.5}O_2$, all Ni is divalent ($Ni^{2+}$) and the Ni-excess is 0. At 4.3 V, the nominal capacity of $LiCoO_2$ and $LiNi_{0.5}Mn_{0.5}O_2$ is about 160 mAh/g, against 220 mAh/g for $LiNiO_2$. Thus, the expected reversible capacity increases with Ni-excess. The reversible capacity of the NMC compound can be calculated easily. For example, the capacity of NMC622, which is a $Li[Ni_{0.4}(Ni_{0.5}Mn_{0.5})_{0.4}Co_{0.2}]O_2$, is comprehended as 0.2 $LiCoO_2$+0.4 $LiNi_{0.5}Mn_{0.5}O_2$+0.4 $LiNiO_2$. The expected capacity equals 0.2×160+0.4×160+ 0.4×220=184 mAh/g. Therefore, the more the Ni-excess increases, the more the capacity of the NMC material increases. Additionally, NMC can also have a Li-excess: $Li_{1+a}[Ni_z(Ni_{0.5}Mn_{0.5})_yCo_x]_{1-a}O_2$. The electrochemical performance of positive electrode materials depends on the reversible and irreversible chemical reaction in a battery. The irreversible capacity (hereafter referred to as "IRRQ") of a battery is defined as (CQ−DQ)/CQ (in %), where CQ and DQ are charge and discharge capacities of the first cycle, respectively. In NMC compounds, the CQ is mostly determined by the elemental composition, particularly it increases as the Ni-excess increases. Therefore, in order to achieve a high capacity for a fixed NMC composition, a low IRRQ is required.

The situation is further complicated in a real battery because the capacity of negative electrode materials also contributes to the DQ of the battery. In an ideal battery, CQ, DQ and IRRQ of positive and negative electrode materials match each other perfectly. However, in a real battery, "battery balancing" or "anode cathode balancing" are more complex topics. In a typical battery design, the CQ of the positive electrode should be less than that of the negative electrode, otherwise Li plating will occur. In addition, the CQ of the positive electrode should not be significantly smaller than that of the negative electrode, otherwise the negative electrode is only partially utilized and the energy density decreases. The IRRQ of practical negative electrode materials (such as graphite) is around 6-8%. On the other hand, the IRRQ of known positive electrode materials (such as NMC) is larger than that of negative electrode materials, and thus the DQ is "limited from the positive electrode material". In other words, during discharge the positive electrode material reaches a low threshold voltage before the negative electrode reaches a higher voltage, and the capacity of the negative electrode is only partially utilized. Therefore, if the IRRQ of the positive electrode material can be reduced, a better utilization of negative electrode material can be possible, resulting in an increased DQ of the battery.

Furthermore, it is desired that the IRRQ of the positive electrode material should be even less than that of the negative electrode material. In such case, the DQ of a battery is "limited from the negative electrode material". The voltage of the negative electrode increases before the voltage of the positive electrode drops. Accordingly, the fully discharged battery contains a fully de-lithiated negative electrode but an only partially lithiated positive electrode.

The pulse power of the battery is an important property which usually is dominated by the positive electrode and decreases at the end of discharge. The decrease of pulse power is caused by the increasingly worse power performance of the positive electrode when the positive electrode approaches the full lithiation. In the negative electrode limited cell, the positive electrode is not fully lithiated at the end of discharge. Thus, the low power region of the positive electrode is not reached. Therefore, the pulse power of the negative electrode limited cell remains high during discharge. In short—positive electrodes with a low IRRQ allow for an improved direct current resistance or pulse power especially near to end of discharge.

To summarize, it is desirable to reduce the IRRQ of positive electrode materials because it allows (1) to increase the reversible capacity of the positive electrode, (2) to better utilize the negative material by a better capacity balancing and (3) to improve the power and DCR of batteries. An object of the present invention is to provide a novel positive electrode active material with an optimal range of compositions and crystallite sizes according to an easily controlled manufacturing process. The positive electrode material should have excellent electrochemical properties such as high reversible capacity, low irreversibility and long cycle stability.

SUMMARY

Viewed from a first aspect, the invention can provide a powderous positive electrode material for lithium ion batteries, comprising crystalline lithium transition metal-based oxide particles having a general formula $Li_{1+a}$ (($Ni_z$ ($Ni_{0.5}Mn_{0.5})_y$ $Co_x)_{1-k}$ $A_k)_{1-a}$ $O_2$, wherein A is a dopant, $-0.030 \leq a \leq 0.025$, $0.10 \leq x \leq 0.40$, $0.25 \leq z \leq 0.52$, $x+y+z=1$ and $k \leq 0.01$, wherein the crystalline powder has a crystallite size less than 33 nm as determined by the Scherrer equation based on the peak of the (104) plane obtained from the X-ray diffraction pattern using a Cu K α radiation source, and wherein the molar ratio MR(Ni) of Ni versus the total transition metal content in a cross section of a particle is higher in the surface area than in the center area of the particle, as determined by EDS analysis. It may be that the molar ratio MR(Ni) of Ni versus the total transition metal content in every cross section of a particle is higher in the surface area than in the center area of the particle. The crystallite size may also be less than 32 nm, or preferably between 25.0 and 30.5 nm. In an embodiment in the general formula $0.15 \leq x \leq 0.25$ and $0.38 \leq z \leq 0.52$. Also preferable is $0.18 \leq x \leq 0.22$, $0.42 \leq z \leq 0.52$ and $1.075 < z/y < 1.625$; yielding even better results for the electrochemical properties of the electrode material. The dopant A may for example be either one or more of Al, Ca, W, B, Si, Ti, Mg and Zr. The value of k may also be zero. In order to easily obtain the gradient described before, it may be best to have a powder having a particle size distribution with a D50 of 8 to 12 μm. When the D50 value is too small it may be that the process used does not permit to obtain the desired gradient.

In a particular embodiment a parameter MR(SC—Ni) is between 1.04 and 1.10, where MR(SC—Ni) is a normalized molar ratio MR(Ni) of the surface area of a particle, obtained by dividing the sum of the two values of MR(Ni) measured at the surface areas of opposite particle edges of an imaginary straight line drawn through the center of the particle, by two times the value of MR(Ni) at the center of the particle. In an embodiment the same is valid for every straight line drawn through the center of the particle. The powderous positive electrode material can preferably have a carbon content ≤400 ppm, or even <200 ppm and most preferably <100 ppm.

It is also possible to still improve the effect of the invention by providing the powder previously described with between 0.15 and 5 wt % of a $LNaSO_4$ secondary phase. Such powder may consist of secondary particles consisting of crystallites, and the crystallites may further comprise a coating comprising this $LiNaSO_4$ secondary phase. Furthermore the secondary phase may further comprise up to 1 wt % of either one or more of $Al_2O_3$, $LAlO_2$, LiF, $Li_3PO_4$, MgO and $Li_2TiO_3$.

Viewed from a second aspect, the invention can provide a method for preparing a powderous positive electrode material according to the present invention, the method comprising the steps of:
providing a M'-based precursor prepared from the co-precipitation of metal salts with a base; wherein the precursor comprises particles having a molar ratio MR(Ni) of Ni versus the total transition metal content in a cross section of a particle that is higher in the surface area than in the center area the particle, as determined by EDS analysis,
mixing the M'-based precursor with either one of LiOH, $Li_2O$ and $LiOH \cdot H_2O$, thereby obtaining a first mixture, whereby the Li to transition metal ratio in the first mixture is between 0.65 and 0.97,
sintering the first mixture in an oxidizing atmosphere in a rotary kiln at a temperature between 650 and 850° C., for a time between ⅓ and 3 hrs, thereby obtaining a lithium deficient precursor powder,
mixing the lithium deficient precursor powder with either one of LiOH, $Li_2O$ and $LiOH \cdot H_2O$, thereby obtaining a second mixture, and
sintering the second mixture in an oxidizing atmosphere at a temperature between 750 and 800° C., for a time between 6 and 36 hrs. As an alternative for the first sintering step, it may be conducted in a chamber furnace for a time between 8 and 36 hrs. The best values for the crystallite size may be obtained for a second sintering temperature between 760-790° C. In an embodiment the M'-based precursor has a particle size distribution with a D50 of 10 to 15 μm, which fits well with the preferred D50 of the final product.

Embodiments of the Present Invention

The present invention covers the following embodiments:
1. A powderous positive electrode material for lithium ion batteries, comprising crystalline lithium transition metal-based oxide particles having a general formula Li1+a ((Niz (Ni0.5Mn0.5)y Cox)1-k Ak)1-a O2, wherein A is a dopant, $-0.030 \leq a \leq 0.025$, $0.10 \leq x \leq 0.40$, $0.25 \leq z \leq 0.52$, $x+y+z=1$ and $k \leq 0.01$, wherein the crystalline powder has a crystallite size less than 33 nm as determined by the Scherrer equation based on the peak of the (104) plane obtained from the X-ray diffraction pattern using a Cu Kα radiation source, and wherein the molar ratio MR(Ni) of Ni versus the total transition metal content in a cross section of a particle is higher in the surface area than in the center area of the particle, as determined by EDS analysis.
2. The powderous positive electrode material of the embodiment 1, wherein MR(SC—Ni) is between 1.04 and 1.10, MR(SC—Ni) being a normalized molar ratio MR(Ni) of the surface area of a particle, obtained by dividing the sum of the two values of MR(Ni) measured at the surface areas of opposite particle edges of an imaginary straight line drawn through the center of the particle, by two times the value of MR(Ni) at the center of the particle.
3. The powderous positive electrode material of the embodiment 1 or 2, wherein $0.18 \leq x \leq 0.22$, $0.42 \leq z \leq 0.52$ and $1.075 < z/y < 1.625$.
4. The powderous positive electrode material of any one of the embodiments 1 to 3, having a crystallite size between 25.0 and 30.5 nm.
5. The powderous positive electrode material of any one of the embodiments 1 to 4, having a carbon content ≤400 ppm.
6. The powderous positive electrode material of any one of the embodiments 1 to 5, wherein the powder further comprises between 0.15 and 5 wt % of a LNaSO4 secondary phase.

Preferably, in the embodiment 6, the powderous positive electrode comprises particles having a coating comprising $LiNaSO_4$, wherein has a content of between 0.15 and 5 wt % of $LiNaSO_4$ with respect to the total weight of the powder. More preferably, the powderous positive electrode comprises particles having, in addition to the coating comprising $LNaSO_4$, a coating comprising $Al_2O_3$, wherein has a content of between 0.1 and 1 wt % of $Al_2O_3$ with respect to the total weight of the powder.
7. The powderous positive electrode material of the embodiment 6, wherein the powder has particles having a coating comprising the LiNaSO4 secondary phase.
8. The powderous positive electrode material of the embodiment 6 or 7, wherein the secondary phase further comprises up to 1 wt % of either one or more of Al2O3, LAlO2, LF, Li3PO4, MgO and Li2TiO3.

9. The powderous positive electrode material of any one of the embodiments 1 to 8, wherein the dopant A is either one or more of Al, Ca, W, B, Si, Ti, Mg and Zr.

10. The powderous positive electrode material of any one of the embodiments 1 to 9, wherein the powder has a particle size distribution with a D50 of 8 to 12 μm.

11. A method for preparing the powderous positive electrode material of any of the preceding embodiments, the method comprising the steps of:

providing a M'-based precursor prepared from the co-precipitation of metal salts with a base; wherein the precursor comprises particles having a molar ratio MR(Ni) of Ni versus the total transition metal content in a cross section of a particle that is higher in the surface area than in the center area the particle, as determined by EDS analysis, mixing the M'-based precursor with either one of LiOH, Li2O and LiOH·H2O, thereby obtaining a first mixture, whereby the Li to transition metal ratio in the first mixture is between 0.65 and 0.97, sintering the first mixture in an oxidizing atmosphere in a rotary kiln at a temperature between 650 and 850° C., for a time between ⅓ and 3 hrs, thereby obtaining a lithium deficient precursor powder, mixing the lithium deficient precursor powder with either one of LiOH, Li2O and LiOH·H2O, thereby obtaining a second mixture, and sintering the second mixture in an oxidizing atmosphere at a temperature between 750 and 800° C., for a time between 6 and 36 hrs.

12. The method according to the embodiment 11, wherein the M'-based precursor has a particle size distribution with a D50 of 10 to 15 μm.

DETAILED DESCRIPTION

The invention focuses on lithium transition metal-based oxides used as a positive electrode active material in rechargeable lithium batteries. Positive electrode materials have the NMC composition which is $Li_{1+a}M'_{1-a}O_2$ with M' being one or more transition metals selected from Ni, Mn, and Co; but M' may also be doped with other elements, such as Al, Ca, Ti, Mg, W, Zr, B and Si, or even non-metals, such elements potentially having a positive influence on the electrochemical performance of the electrode material. Positive electrode materials of the invention have a specific range of composition and optimal crystallite size which allow to achieve high discharge capacity (DQ1) and low irreversibility (IRRQ).

Positive electrode active materials disclosed in this invention may be manufactured by a double sintering method as discussed in co-pending patent application WO2018/158078A1, disclosing a method for preparing a positive electrode material having the general formula $Li_{1+a'}M'_{1-a'}O_2$, with $M'=(Ni_z(Ni_{0.5}Mn_{0.5})_yCo_x)_{1-k}A_k$, wherein $x+y+z=1$, $0.1 \leq x \leq 0.4$, $0.25 \leq z \leq 0.52$, A is a dopant, $0 \leq k \leq 0.1$, and $0.01 \leq a' \leq 0.10$, the method comprising the steps of:

providing a M'-based precursor prepared from the co-precipitation of metal salts with a base;

mixing the M'-based precursor with either one of LiOH, Li2 and LiOH·H2O, thereby obtaining a first mixture, whereby the Li to transition metal ratio in the first mixture is between 0.65 and 0.97, sintering the first mixture in an oxidizing atmosphere in a rotary kiln at a temperature between 650 and 850° C., for a time between ⅓ and 3 hrs, thereby obtaining a lithium deficient precursor powder, mixing the lithium deficient precursor powder with either one of LiOH, Li2 and LiOH·H2O, thereby obtaining a second mixture, and sintering the second mixture in an oxidizing atmosphere at a temperature between 800 and 1000° C., for a time between 6 and 36 hrs. The double sintering process is superior to the normal one-step sintering process for producing high Ni NMC materials in terms of production throughput. As an alternative of the first sintering step, it may be conducted in a chamber furnace for a time between 8 and 36 hrs.

A typical precursor of a NMC is a mixed transition metal hydroxide, oxy-hydroxide, carbonate, oxide etc. The hydroxide and oxy-hydroxides have the general formula $(Ni_z(Ni_{0.5}Mn_{0.5})_yCo_x)O_v(OH)_w$, wherein $0 \leq v \leq 1$ and $v+w=2$. Depending on drying conditions the transition metal valence state differs. If drying is performed in oxygen, a higher valence state is achieved compared to drying in nitrogen. Therefore, knowledge of the valence state allows to estimate v and w, which results in the deduction of the expected hydroxide composition. It should be mentioned that if the drying temperature is high enough, the hydroxide or oxy-hydroxide gradually converts to oxide.

In this invention, in the $1^{st}$ sintering process step, a lithium deficient intermediate product is prepared by blending the mixed transition metal precursor with a lithium source, followed by firing. Typically, LiOH·H2 or Li2CO3 is used as a lithium source. The use of Li2CO3 allows to reduce the preparation cost, but Li2CO3 cannot be used if the Ni-excess is too high. The blend has a Li/M' stoichiometric ratio less than unity, typically ranging from 0.70 to 0.95. The blend is sintered in an oxygen containing gas (for example, in a flow of air or oxygen) at a typical $1^{st}$ sintering temperature higher than 650° C. but less than 870° C. if Li2CO3 is used a lithium precursor. The temperature can be lowered if LiOH or LiOH·H2O are used because LiOH has higher reactivity. Choices of a lithium source, the $1^{st}$ sintering temperature, and the $1^{st}$ sintering atmosphere are important because these process conditions can determine the property of the final positive electrode material. The most important properties of the lithium deficient intermediate product are the content of surface impurities such as (unreacted) LiOH and Li2CO3 and the primary particle size.

If the amount of unreacted Li is too high—for example larger than 10%—then the $1^{st}$ firing temperature may be too low. If significant Li2CO3 impurities are present, the firing time or temperature may be increased or the Li:M' ratio may be decreased. A low Li2CO3 impurity—typically less than 0.5 wt %—is desirable as it is difficult to remove the impurity during the $2^{nd}$ sintering step. If the crystallinity after the $1^{st}$ sintering step is larger than the target after the $2^{nd}$ sintering step, then the $1^{st}$ firing time and/or temperature are decreased. This is because any further firing will only increase, never decrease the size of crystallites. If the primary particle size of the lithium deficient intermediate is in the low nano range, it can be increased in the $2^{nd}$ sintering step. However, if the size is too high, it cannot be adjusted in the $2^{nd}$ sintering step.

In the $2^{nd}$ sintering process step, the lithium deficient intermediate is mixed with a lithium source in order to obtain the final Li/M' target composition, which is near to the stoichiometric Li/M'=1.00 value. The blend is sintered in an oxygen containing gas (for example, in a flow of air or oxygen) to obtain the final positive electrode active material. A $2^{nd}$ sintering temperature in this invention is typically greater than 700° C. but less than 800° C. The $2^{nd}$ sintering time including heating and cooling is set in the range of 8 to 36 hours. The $2^{nd}$ sintering condition determines the primary particle size of the positive electrode material, and has a major influence on its properties.

The final product should have a low quantity of surface impurities. When $Li_2CO_3$ is present as a surface impurity, this can cause an undesirable gas generation during battery cycling, and LiOH as a surface impurity can result in a process issue during the electrode slurry preparation. The amount of surface impurity can be minimized by selecting a high sintering temperature, using LiOH as a lithium source and by the use of a pure oxygen gas atmosphere.

The primary particle size can thus be controlled by sintering temperatures. In this invention, surprisingly, it is observed that the combination of a selected NMC composition range and a crystallite size less than 33 nm, and preferably less than 32 nm, more preferably less than 30 nm, achieves good cycle stability as well as a low IRRQ.

The crystallite size less than 33 nm can be achieved by decreasing the 2nd sintering temperature by at least 50° C. versus the normal temperature that corresponds to the selected composition as described in patent WO2018/158078A1. Since the $2^{nd}$ sintering temperature decreases, it is more difficult to achieve an acceptable surface impurity level. Thus, LiOH or LiOH·$H_2O$ are preferably used as lithium precursors, and both the intermediate Li-M'-oxide as well as lithium precursors need to have a low $Li_2CO_3$ impurity level. The use of oxygen gas during the $2^{nd}$ firing further helps to reduce surface impurity levels.

The improved electrochemical performance is preferably obtained when the Co content is ranging from 0.15 to 0.25, and Ni and Mn vary within a small range. This Ni—Mn range can be expressed by 2 relations that are also related to each other. The molar ratio of Ni/Mn, expressed by $(2z+y)/y$ in the formula $Li_{1+a}[Ni_z(Ni_{0.5}Mn_{0.5})_yCo_x]_{1-a}O_2$, can affect the performance such as capacity and cycle stability. When the Ni/Mn ratio increases, the total discharge capacity increases, but when the ratio becomes too high, the stability of the electrode material decreases. When on the other hand the Mn content increases versus the Ni content, battery safety and cycle retention are improved, whereas the capacity decreases. As the Ni content increases, both the Ni-excess (expressed by "z" in the formula $Li_{1+a}[Ni_z(Ni_{0.5}Mn_{0.5})_yCo_x]_{1-a}O_2$) and the Ni to Mn stoichiometric ratio increases. An improved performance is obtained if the Ni-excess ranges from 0.25 to 0.52 and a corresponding Ni to Mn stoichiometric ratio ranging from 1.83 to 5.52, but preferably between 2.8 and 4.5.

The invention further observes that the positive electrode material has a special composition gradient from the surface to the center. Generally, positive electrode materials with a concentration gradient from the surface to the center can be obtained by using a precursor with a concentration gradient that is produced by a dedicated co-precipitation process. For example, a positive electrode active material having a concentration gradient layer can be prepared by using a mixed transition metal hydroxide from a batch reactor for co-precipitation. The degree of gradient is determined by comparing the molar ratio of elements between the surface and the center. Higher Ni contents in the surface region of positive electrode materials can enhance the electrochemical property such as the IRRQ. The gradient is only present at low crystallinity levels.

If normal firing temperatures like those in WO2018/158078A1 are applied, the final product crystallinity is higher than 33 nm and the gradient disappeared. It is anticipated that the low IRRQ is related to the conservation of the gradient during the soft $2^{nd}$ firing conditions. The concentration gradient of the final positive electrode results from a corresponding concentration gradient in the hydroxide precursor. However, during firing, the concentration gradient has a tendency to smoothen; therefore, a real core-shell concentration type of precursors—with a neat distinction in composition between core and shell—can also cause a concentration gradient in the positive electrode. The final gradient in the positive electrode depends on firing conditions and on the initial composition gradient of the precursor.

The performance of positive electrode materials can be further enhanced by surface modification. Providing a coating on the surface of positive electrode materials is a known strategy to suppress side reactions between the electrode materials and the electrolytes that can lead to poor electrochemical performance during the cycling. Surface coatings may also enhance the structural stability of positive electrode materials, resulting in excellent battery performance.

WO2016/116862 discloses a surface treatment providing a surface layer consisting of an intimate mixture of the metal elements of the N(M)C materials and either one or more compounds from the group consisting of $Al_2O_3$, $TiO_2$, MgO, $WO_3$, $ZrO_2$, $Cr_2O_3$ and $V_2O_5$. In a particular embodiment, the surface layer consists of an intimate mixture of elements of the core, LiF and nanometric crystalline $Al_2O_3$, which treatment allows to increase the charging voltage without deteriorating performance, and thus allowing to achieve a higher energy density. As is discussed in WO2015/128722, the decomposition of soluble surface base compounds, which directly influences the battery performance, can be further enhanced by applying a surface treatment with $Na_2S_2O_8$. As an example, the $Na_2S_2O_8$ treatment could be combined with $AlF_3$ (or $Li_3AlF_6$), $AlPO_4$, $Al(OH)_2$ or $Al_2O_3$ treatment. Both the fluorides, the phosphates, the oxide and the hydroxide are lithium acceptors, which can help to decompose the soluble base and at the same time create an oxide $Al_2O_3$ or $LiAlO_2$ surface film.

The following analysis methods are used in the Examples:

A) SEM and EDS Analysis

A1) SEM Analysis

The morphology of the positive electrode material and of its cross-section are analyzed by a Scanning Electron Microscopy (SEM) technique. The measurement is performed with a JEOL JSM 7100F scanning electron microscope equipment under a high vacuum environment of $9.6 \times 10^{-5}$ Pa at 25° C. The images of samples are recorded with magnifications of 2000 to 10000 times.

A2) Cross-Section Preparation

The cross-section of the positive electrode material is prepared by an ion beam cross-section polisher (CP) instrument, which is a JEOL (IB-0920CP). The instrument uses argon gas as beam source. A small amount of the positive electrode material powder is mixed with a resin and hardener, then the mixture is heated for 10 minutes on a hot plate. After heating, it is placed into the ion beam instrument for cutting, and the settings are adjusted in a standard procedure, with a voltage of 6.5 kV for a 3 hours duration. The cross-section of positive electrode materials is analyzed by method A1).

A3) EDS Analysis

Figure 1:
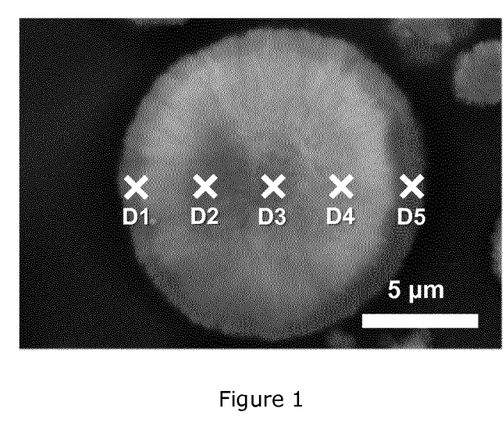
FIG. 1. Cross-sectional SEM image of pEX, with selected positions (D1, D2, D3, D4 and D5) for EDS analysis FIG. 2. EDS profiles of the Ni/M' molar ratio (mol/mol) of pEX1 and pCEX2 at selected positions FIG. 3. EDS profiles of the Ni/M' molar ratio (mol/mol) of EX1.7 and CEX2.2 at selected positions

Using the samples prepared in method A2), the concentration gradient from the surface part to the center part of positive electrode material particles is analyzed by SEM and energy-dispersive X-ray spectroscopy (EDS). The SEM/EDS is performed on a JEOL JSM 7100F SEM equipment with a 50 mm² X-Max$^N$ EDS sensor from Oxford instruments. An EDS analysis of positive electrode material particles provides the quantitative element analysis of the cross-section. In the cross-section EDS, it is assumed that particles are spherical. An imaginary straight line is set from the surface point to the opposite surface point of a particle, where the line passes the center point of the particle. The 1$^{st}$ surface point is set as 'D1', the center point is set as 'D3' and the 2$^{nd}$ surface point is set as 'D5'. The additional two points, which are 'D2' and 'D4', between the center (D3) and the surfaces (D1 and D5), are shown in FIG. 1. The 5 points are investigated by an EDS analysis with a scanning time of 1 min. The EDS analysis of the surface points D1 and D5 are taken as close to the surface as is experimentally feasible (i.e. at approx. 0.5 µm distance from the surface), since a measurements at the very edge of the particle would result in a false contribution by exterior influences. The EDS results in examples give the average of the values obtained from a selection of four particles.

B) PSD Analysis

The PSD is measured using a Malvern Mastersizer 3000 with Hydro MV wet dispersion accessory after dispersing the powder in an aqueous medium. In order to improve the dispersion of the powder, sufficient ultrasonic irradiation and stirring is applied, and an appropriate surfactant is introduced. D10, D50 and D90 are defined as the particle size at 10%, 50% and 90% of the cumulative volume % distribution.

C) X-Ray Diffraction Measurement

The X-ray diffraction pattern of the positive electrode material is collected with a Rigaku X-Ray Diffractometer (Ultima IV) using a Cu K α radiation source (40 kV, 40 mA) emitting at a wavelength of 1.5418 Å. The instrument configuration is set at: a 1° Soller slit (SS), a 10 mm divergent height limiting slit (DHLS), a 1° divergence slit (DS) and a 0.3 mm reception slit (RS). The diameter of the goniometer is 158 mm. For the XRD, diffraction patterns are obtained in the range of 5-85° (2θ) with a scan speed of 1° per min and a step-size of 0.02° per scan. The crystallite sizes are calculated from the diffraction angle and the full width at half maximum (FWHM) of the peak of the (104) plane obtained from the X-ray diffraction pattern using the known Scherrer equation:

$$\tau = \frac{K\lambda}{\beta \cos\theta}$$

τ: Crystallite size (nm), being the mean size of the ordered (crystalline) domains, which may be smaller or equal to the grain size
K: Scherrer constant, 0.9
λ: X-ray wavelength (CuKα=1.5418 Å)
β: FWHM
θ: XRD peak position, one half of 2θ

The peak of the (104) plane assigned to a crystal structure with space group R-3m is observed at (around) 44.5±1° in an X-ray diffraction pattern.

D) Coin Cell Testing

D1) Coin Cell Preparation

For the preparation of a positive electrode, a slurry that contains electrochemical active material, conductor (Super P, Timcal), binder (KF #9305, Kureha)—with a formulation of 90:5:5 by weight—in a solvent (NMP, Mitsubishi) is prepared by a high speed homogenizer. The homogenized slurry is spread on one side of an aluminum foil using a doctor blade coater with a 230 µm gap. The slurry-coated foil is dried in an oven at 120° C. and then pressed using a calendaring tool. Then it is dried again in a vacuum oven to completely remove the remaining solvent in the electrode film. A coin cell is assembled in an argon-filled glovebox. A separator (Celgard 2320) is located between the positive electrode and a piece of lithium foil used as a negative electrode. 1M LiPF$_6$ in EC/DMC (1:2) is used as electrolyte and is dropped between separator and electrodes. Then, the coin cell is completely sealed to prevent leakage of the electrolyte.

D2) Testing Method

The coin cell test in the present invention, which is a conventional "constant cut-off voltage" test, follows the schedule shown in Table 1. Each cell is cycled at 25° C. using a Toscat-3100 computer-controlled galvanostatic cycling station (from Toyo). The coin cell testing procedure uses a 1C current definition of 160 mA/g and comprises two parts as follows: Part I is the evaluation of rate performance at 0.1C, 0.2C, 0.5C, 1C, 2C and 3C in the 4.3-3.0V/Li metal window range. With the exception of the 1$^{st}$ cycle where the initial charge capacity (CQ1) and discharge capacity (DQ1) are measured in constant current mode (CC), all subsequent cycles featuring a constant current-constant voltage during the charge with an end current criterion of 0.05C. A rest time of 30 minutes for the first cycle and 10 minutes for all subsequent cycles is allowed between each charge and discharge.

The irreversible capacity IRRQ is expressed in % as follows:

$$IRRQ = \frac{(CQ1 - DQ1)}{CQ1} \times 100(\%)$$

Part II is the evaluation of cycle life at 1C. The charge cut-off voltage is set as 4.5V/Li metal. The discharge capacity at 4.5V/Li metal is measured at 0.1C at cycles 7 and 34 and 1C at cycles 8 and 35.

Part III is an accelerated cycle life experiment using 1C-rate for the charge and 1C rate for the discharge between 4.5 and 3.0V/Li metal. Capacity fading 1C/1C QFad. is calculated as follows:

$$1C/1C\ QFad. = \left(1 - \frac{DQ60}{DQ36}\right) \times \frac{10000}{24} \text{in \%}/100 \text{ cycles}$$

TABLE 1

Cycling schedule for Coin cell testing method 2

| Type | Cycle No | C Rate | End current | Rest (min) | V/Li metal (V) | C Rate | End current | Rest (min) | V/Li metal (V) |
|---|---|---|---|---|---|---|---|---|---|
| | | | Charge | | | | Discharge | | |
| Part I | 1 | 0.10 | — | 30 | 4.3 | 0.10 | — | 30 | 3.0 |
| | 2 | 0.25 | 0.05 C | 10 | 4.3 | 0.20 | — | 10 | 3.0 |
| | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |
| Part II | 7 | 1.00 | — | 10 | 4.5 | 1.00 | — | 10 | 3.0 |
| | 8 | 0.25 | 0.1 C | 10 | 4.5 | 1.00 | — | 10 | 3.0 |
| | 9~33 | 0.50 | 0.1 C | 10 | 4.5 | 1.00 | — | 10 | 3.0 |
| | 34 | 0.25 | 0.1 C | 10 | 4.5 | 0.10 | — | 10 | 3.0 |
| | 35 | 0.25 | 0.1 C | 10 | 4.5 | 1.00 | — | 10 | 3.0 |
| Part III | 36~60 | 1.00 | — | 10 | 4.5 | 1.00 | — | 10 | 3.0 |

E) Full Cell Testing 650 mAh pouch-type cells are prepared as follows: the positive electrode material, Super-P (Super-P, Timcal), graphite (KS-6, Timcal) as positive electrode conductive agents and polyvinylidene fluoride (PVDF 1710, Kureha) as positive electrode binder are added to N-methyl-2-pyrrolidone (NMP) as dispersion medium so that the mass ratio of the positive electrode active material powder, the positive electrode conductive agents (super P and graphite) and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15 μm thick aluminum foil. The width of the applied area is 43 mm and the length is 406 mm. The typical loading weight of a positive electrode active material is about 11.5±1 mg/cm². The electrode is then dried and calendared using a pressure of 100 kgf (980.7 N) to an electrode density of 3.3±0.5 g/cm³. In addition, an aluminum plate serving as a positive electrode current collector tab is arc-welded to an end portion of the positive electrode.

Commercially available negative electrodes are used. In short, a mixture of graphite, carboxy-methyl-cellulose-sodium (CMC), and styrenebutadiene-rubber (SBR), in a mass ratio of 96/2/2, is applied on both sides of a copper foil. A nickel plate serving as a negative electrode current collector tab is arc-welded to an end portion of the negative electrode. A typical loading weight of a negative electrode active material is 8±1 mg/cm². Non-aqueous electrolyte is obtained by dissolving lithium hexafluorophosphate ($LiPF_6$) salt at a concentration of 1.0 mol/L in a mixed solvent of ethylene carbonate (EC) and diethyl carbonate (DEC) in a volume ratio of 1:2.

A sheet of positive electrode, negative electrode, and a separator made of a 20 μm-thick microporous polymer film (Celgard® 2320, Celgard) interposed between them are spirally wound using a winding core rod in order to obtain a spirally-wound electrode assembly. The assembly and the electrolyte are then put in an aluminum laminated pouch in an air-dry room with dew point of −50° C., so that a flat pouch-type lithium secondary battery is prepared. The design capacity of the secondary battery is 650 mAh when charged to 4.20V. The non-aqueous electrolyte solution is impregnated for 8 hours at room temperature. The battery is pre-charged to 15% of its theoretical capacity and aged for a day at room temperature. The battery is then degassed and the aluminum pouch is sealed. The battery is prepared for use as follows: the battery is charged using a current of 0.2C (with 1C=630 mA) in CC mode (constant current) up to 4.2V, then in CV mode (constant voltage) until a cut-off current of C/20 is reached, before the discharge in CC mode at 0.5C rate, down to a cut-off voltage of 2.7V.

The prepared full cell battery is charged and discharged several times under the following conditions at 25° C. to determine the charge-discharge cycle performance:
- the charge is performed in CC mode under 1C rate up to 4.2V, then CV mode until C/20 is reached,
- the cell is then set to rest for 10 minutes,
- the discharge is done in CC mode at 1C rate down to 2.7V,
- the cell is then set to rest for 10 minutes,
- the charge-discharge cycles proceed until the battery reaches around 80% retained capacity. Every 100 cycles, one discharge is done at 0.2C rate in CC mode down to 2.7V.

In the Examples, a relative discharge capacity ("RDC" in %) is defined as the discharge capacity at 200 cycles and 600 cycles divided by the initial discharge capacity and multiplied by 100. To determine the long-term cycling stability, the value of the slope S (in %) between the relative discharge capacities after 200 cycles and 600 cycles is calculated as follows:

$$S = \frac{(RDC \text{ after } 200 \text{ cycles} - RDC \text{ after } 600 \text{ cycles})}{200 \text{ cycles} - 600 \text{ cycles}} \times 100\% \text{ (in \%/cycle)}$$

F) Carbon Analysis

Contents of carbon of positive electrode active materials are measured by a Horiba EMIA-320V Carbon/Sulfur analyzer. 1 g of NMC sample is placed in a ceramic crucible in a high frequency induction furnace. 1.5 g of tungsten and 0.3 g of tin as accelerators are added into the crucible. The sample is heated to a programmable temperature. Gases produced during the combustion are then analyzed by four Infrared detectors. The analysis of low and high $CO_2$ and CO determines the carbon concentration.

The invention is further exemplified in the following examples:

Example 1 and Comparative Example 1

NMC powders, having the formula $Li_{1+a}(Ni_{0.45}(Ni_{0.5}Mn_{0.5})_{0.35}Co_{0.20})_{1-a}O_2$ are obtained through a double sintering process—as discussed in patent application WO2018/158078A1—which is a solid state reaction between a lithium source and a mixed transition metal source running as follows:

1) A mixed metal precursor is obtained by precipitation in a pilot line. The process uses a larger-scale (about 100 L) continuous stirred tank reactor (CSTR). A feed of metal sulfate (in the following $M_a$- or $M_b$-$SO_4$) (2M) and a feed of NaOH (10M) are supplied to the reactor. Additionally, a flow of $NH_4OH$ (15M) is added as a complexing agent. The residence time—being the reactor volume divided by total flow rate—is 3 h, and the temperature is set at 60° C. A protective atmosphere of $N_2$ is recommended to keep the level of impurities low. Gradient type precursors can be prepared by several methods which are inspired by US2016/0126548 A1 and which yield core-shell precursors resulting in yield gradient type of final cathodes. The methods are based on a change of metal composition of the feed solution during precipitation. If a single reactor is used, in the beginning the composition of the feed is $M_a=Ni_{0.3}(Ni_{0.5}Mn_{0.5})_{0.5}Co_{0.2}$. Then, the composition of the feed solution gradually changes and finally reaches a composition of $M_b=Ni_{0.5}(Ni_{0.5}Mn_{0.5})_{0.3}Co_{0.2}$. This gradual change of composition is achieved by mixing flows of 2 metal sulfate solutions with composition $M_a$ and $M_b$, where initially the flow ratio is 1:0 to become finally 0:1.

Alternatively, a storage tank can be used, initially filled with a solution of composition $M_a$, and being continuously amended by filling up with a solution of composition $M_b$. During precipitation, initially the composition of (small) particles is near to $M_a$, but as particles start to grow and the composition of the feed changes the composition of the outside shell approaches $M_b$. To avoid both loss of precipitate and new nucleation taking place, it is advisable to "thicken" the solution. This means a filtrate basically free of precipitate is removed from the reactor through suitable filtering or back feeding of solid. It should be noted that the relationship between a) concentration gradient in the product, b) concentration gradient in the precursor and c) composition of feed-flow over time, are not trivial. For example, to achieve a linear gradient in the precursor—linear referring to a concentration changing as a function of the radius—requires a faster initial change of feed solution composition. This is because the core contributes much less to the volume than the core. Additionally, gradients tend to change during firing.

As a third possibility, also discussed in US 2016/0126548 A1, the core shell precursors may be achieved by using a reactor cascade. Reactor cascades allow for a continuous precipitation process. 2 reactors are attached in series and the overflow of reactor 1 is fed into rector 2. Preferably, the overflow solution is "thickened" by a suitable filtering step before feeding it into the $2^{nd}$ reactor. With the meaning explained previously, the metal feed solution in reactor 1 has a composition $M_a$, whereas the metal feed solution in reactor 2 has a composition $M_b$.

Finally, the collected precursor slurry of any of the previously described methods is filtered and washed by de-ionized water, and then dried at 150° C. for 24 hours under $N_2$ atmosphere, obtaining the mixed metal hydroxide precursor $M'O_{0.39}(OH)_{1.61}$ with metal composition $M'=Ni_{0.45}(Ni_{0.5}Mn_{0.5})_{0.35}Co_{0.20}$. The precursor is labelled as pEX1, has a D50 of 11.85 μm, which is analyzed by method B), and has a core-shell structure with a Ni gradient as discussed below and shown in FIG. 2.

2) $1^{st}$ blending: to obtain a lithium deficient sintered intermediate product, $LiOH \cdot H_2O$ as a lithium source and the mixed transition metal precursor (of 1)) are homogenously blended at a Li/M' ratio of 0.80 (for a=−0.111) in a Henschel Mixer® for 30 minutes.

3) $1^{st}$ sintering: the blend from the $1^{st}$ blending step is sintered at 720° C. for 10 hours under an oxygen atmosphere in a chamber furnace. After the $1^{st}$ sintering, the sintered powder is sieved so as to prepare it for the $2^{nd}$ blending step. The product obtained from this step is a lithium deficient sintered intermediate product, since the Li/M' stoichiometric ratio in $Li_{1+a}M'_{1-a}O_2$ is less than 1.

4) $2^{nd}$ blending: the lithium deficient sintered intermediate is blended with $LiOH \cdot H_2O$ in order to correct the Li stoichiometry (in this example EX1.1 to Li/M'=0.95). The blending is performed in a Henschel Mixer® for 30 minutes.

5) $2^{nd}$ sintering: the blend from the $2^{nd}$ blending is sintered at 775° C. for 10 hours under an oxygen atmosphere in a chamber furnace.

6) Post treatment: after the $2^{nd}$ sintering, the sintered cake is crushed, classified, and sieved so as to obtain a non-agglomerated NMC powder.

The NMC compound produced by above steps is labeled EX1.1 having as formula $Li_{0.974}M'_{1.026}O_2$ with $M'=Ni_{0.45}(Ni_{0.5}Mn_{0.5})_{0.35}Co_{0.2}$. EX1.1 has a D50 of 10.58 μm. The pressed density of the cathode material should be high to allow for a high energy density of the rechargeable cell. The pressed density is relatively low for narrow SPAN cathode materials. Therefore it might be preferable to apply cathode materials which do not have a narrow SPAN. A typical value for (D90-D10)/D50 is larger than or about 1.0.

EX1.2 to EX1.9 and CEX1.1 to CEX1.6 are prepared using the same process steps as in EX1.1. The target Li stoichiometry and $2^{nd}$ sintering temperature of each example is varied and shown in Table 2. To investigate the crystallinity of the NMC compounds depending on the target Li/M' ratio and the $2^{nd}$ sintering temperature, EX1.1 to EX1.9 and CEX1.1 to CEX1.6 are analyzed by method C). In this analysis, the crystallite sizes are calculated by Scherrer equation using the peak of (104) plane at (around) 44.5±1° in an X-ray diffraction pattern. To evaluate the examples as a positive electrode material for LIBs, coin cells are prepared by method D1), and the conventional coin cell test is performed using method D2). The initial discharge capacity (DQ1) is measured at 0.1C in the 4.3-3.0V/Li metal window range. Capacity fading (1C/1C QFad.) is measured at 1C for charge and discharge in the 4.5-3.0V/Li metal. The irreversible capacity (IRRQ) is measured at the $1^{st}$ charge/discharge cycle. Crystallite sizes, initial discharge capacities, and irreversible capacities of Example 1 and Comparative Example 1 are shown in Table 2.

TABLE 2

Properties of Example 1 and Explanatory Example 1

| Example ID | Li/M' | $2^{nd}$ sintering T (° C.) | Crystallite size (nm) | DQ1 (mAh/g) | IRRQ (%) |
|---|---|---|---|---|---|
| EX1.1 | 0.95 | 775 | 25.9 | 189.2 | 4.5 |
| EX1.2 | 0.96 | 780 | 26.3 | 187.0 | 5.5 |
| EX1.3 | 0.98 | 780 | 26.7 | 187.2 | 5.9 |
| EX1.4 | 0.99 | 760 | 25.7 | 189.1 | 4.7 |
| EX1.5 | 0.99 | 790 | 29.0 | 190.2 | 4.9 |
| EX1.6 | 1.01 | 760 | 26.1 | 189.5 | 4.7 |
| EX1.7 | 1.01 | 790 | 29.8 | 189.6 | 5.3 |
| EX1.8 | 1.03 | 760 | 26.6 | 188.5 | 5.0 |
| EX1.9 | 1.03 | 790 | 30.1 | 187.9 | 5.4 |
| CEX1.1 | 0.99 | 820 | 33.4 | 188.6 | 6.3 |
| CEX1.2 | 0.99 | 840 | 37.4 | 185.0 | 7.8 |
| CEX1.3 | 1.01 | 820 | 33.6 | 187.8 | 6.4 |
| CEX1.4 | 1.01 | 840 | 37.1 | 185.1 | 7.8 |
| CEX1.5 | 1.03 | 820 | 33.8 | 185.9 | 6.7 |
| CEX1.6 | 1.03 | 840 | 37.1 | 183.2 | 8.5 |

As shown in Table 2, NMC products having a crystallite size less than 33 nm have a higher discharge capacity (>185 mAh/g) and lower irreversibility (<6.0%). Regardless of the Li stoichiometry, when the NMC product has the crystallite size less than 33 nm, it shows the enhanced electrochemical performance. The product with an optimal crystallite size is prepared at 760 to 790° C. during the $2^{nd}$ sintering process. Note that if the crystallite size is smaller than 20 nm, the discharge capacity decreases and the cycle stability worsens. As such small crystallite sizes result from sintering at low temperatures like 700° C., the product may have a low crystallinity and high surface impurity, which leads to poor electrochemical performance.

A dedicated surface treatment may further improve the battery properties. For this EX1.3 is blended with 1000 ppm $Al_2O_3$ as a coating source in a Henschel Mixer® for 30 minutes. After that, the prepared blend is heated for 5 hours in the range of 750° C. under an oxygen containing atmosphere in a chamber furnace. The obtained NMC product is encapsulated with an Al layer on its surface and labeled EX1.10.

EX1.3 is also blended with 1.2 wt % of sodium persulfate ($Na_2S_2O_8$) and 0.2 wt % $Al_2O_3$ in a Henschel Mixer® for 30 minutes. The blend is heated at 375° C. for 5 hours under air. As described in WO2015/128722, the final product carries a coating comprising $LNaSO_4$ and $Al_2O_3$ on the surface, and is labeled EX1.11. The electrochemical performance of EX1.10 and EX1.11 are evaluated by method D2). The initial discharge capacities, irreversible capacities, and capacity fading at 1C (1C/1C QFad.) of EX1.10 and EX1.11 are shown in Table 3.

TABLE 3

Electrochemical properties of EX1.3; 1.10 and 1.11

| Example ID | DQ1 (mAh/g) | IRRQ (%) | 1C/1C Qfad. (%) |
|---|---|---|---|
| EX1.3 | 187.2 | 5.9 | 18.7 |
| EX1.10 | 186.8 | 6.0 | 13.5 |
| EX1.11 | 185.5 | 5.8 | 14.2 |

Table 3 shows that EX1.10 and EX1.11 have a decreased capacity fading, which indicates that the electrochemical performance such as cycling stability can be enhanced by these specific surface modification techniques.

The electrochemical performance of EX1.3, EX1.10, and EX1.11 are also evaluated by method E): full cell testing results of the examples are shown in Table 4.

TABLE 4

Full cell testing results of EX1.3; 1.10 and 1.11

| Example ID | Specific capacity (mAh/g) | Efficiency (%) | RDC after 200 cycles | RDC after 600 cycles | Slope S |
|---|---|---|---|---|---|
| EX1.3 | 171.4 | 86.3 | 95.16 | 92.54 | −0.66% |
| EX1.10 | 170.2 | 85.7 | 94.87 | 93.34 | −0.38% |
| EX1.11 | 169.1 | 86.3 | 95.54 | 93.78 | −0.44% |

Table 4 shows the specific capacity and efficiency at the $1^{st}$ charge/discharge cycle in the range of 4.2 to 2.7V. The relative discharge capacity (RDC in %) at 200 cycles and 600 cycles is also given. The surface modified NMC compounds such as EX1.10 and EX1.11 have a higher relative discharge capacity (%) after 600 cycles meaning that the surface coating contributes to the cycling stability. The values of the slope S between the relative discharge capacities after 200 cycles and 600 cycles is calculated as follows (here for EX1.3):

$$S = \frac{(95.16 \text{ after 200 cycles} - 92.54 \text{ after 600 cycles})}{200 \text{ cycles} - 600 \text{ cycles}} \times 100\% = -0.66 \text{ \%/cycle}$$

We observe that the slope improves when applying the Al or $Al/LiNaSO_4$ coating on the surface of the electrode material.

Comparative Example 2

Figure 2:
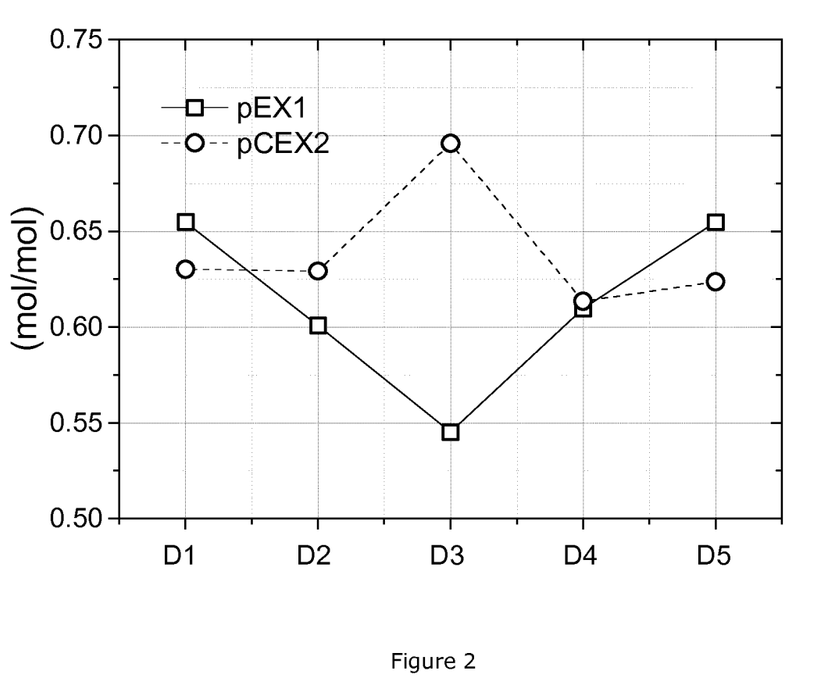

CEX2.1 with formula $Li_{0.995}M'_{1.005}O_2$ with $M'=Ni_{0.45}(Ni_{0.5}Mn_{0.5})_{0.35}Co_{0.20}$ is prepared using the same method as in EX1.1, except that the mixed transition metal flow compositions $M_a$ and $M_b$ are varied resulting in a $M'O_{0.29}(OH)_{1.71}$ with $M'=Ni_{0.45}(Ni_{0.5}Mn_{0.5})_{0.35}Co_{0.20}$, having a different gradient. The product is made by co-precipitation reactions in one reactor as described in US2016/0126548, resulting in a precursor with a core-shell structure with a Ni gradient as is shown in FIG. 2. The precursor is labelled as pCEX2. In the $2^{nd}$ blending and sintering process, the target Li stoichiometry is 0.99 and the sintering temperature is 790° C.

CEX2.2 with formula $Li_{1.005}M'_{0.995}O_2$ with $M'=Ni_{0.45}(Ni_{0.5}Mn_{0.5})_{0.35}Co_{0.20}$ is prepared using the same method as in EX1.1, except that the $2^{nd}$ blend has a Li stoichiometry of 1.01. The crystallite size and electrochemical performance of CEX2.1 and CEX2.2 are evaluated by the same method as in Example 1. The crystallite sizes, initial discharge capacities, and irreversible capacities of CEX2.1 and CEX2.2 are shown in Table 5.

TABLE 5

Properties of Comparative Example 2

| Example ID | Li/M' | $2^{nd}$ sintering T (° C.) | Crystallite size (nm) | DQ1 (mAh/g) | IRRQ (%) |
|---|---|---|---|---|---|
| CEX2.1 | 0.99 | 790 | 30.7 | 186.5 | 6.8 |
| CEX2.2 | 1.01 | 790 | 30.9 | 187.0 | 7.1 |

CEX2.1 and CEX2.2 have the crystallite size less than 33 nm, which may contribute to the enhanced battery performance as in Example 1. However, these examples show the lower initial discharge capacity and higher irreversibility than that of EX1.5 and EX1.7, which are prepared at Li/M' of 0.99 and 1.01 in the range of 790° C. To investigate the cause of this worse battery performance of CEX2.1 and CEX2.2, cross-sections of pEX1, pCEX2, EX1.7, and CEX2.2 are analyzed as described in methods A2) and A3). In this analysis, the formation of a concentration gradient on the NMC compounds is confirmed. FIG. 1 shows a cross-sectional SEM image of pEX1 with selected positions (D1, D2, D3, D4, and D5) for EDS analysis. FIG. 2 shows EDS analysis results of the selected positions (x axis—Dx position) for pEX1 and pCEX2, where the y axis indicates the Ni/M' molar ratio (mol/mol) (M'=Ni, Mn, and Co). The Ni/M' (mol/mol) ratios on D1 to D5 are indicated as Ni(1) to Ni(5), respectively. The results shown are the average of values obtained from four electrode particles. As shown in FIG. 2, in pEX1, the Ni/M' ratio of the surface part (Ni(1) and Ni(5)) is higher than that of the center part (Ni(3)). Contrary to this, pCEX2 has a lower Ni/M' ratio in the surface part than in the center part.

Figure 3:
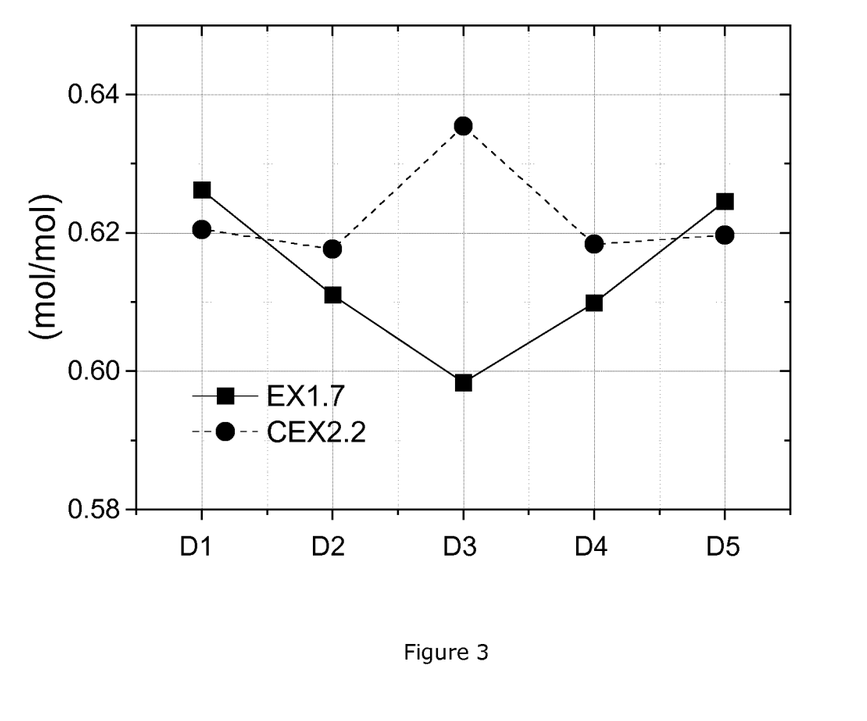

After the $2^{nd}$ sintering process, EX1.7 and CEX2.2 have the same gradient trend of Ni as precursors pEX1 and pCEX2, as shown in FIG. 3. The degree of the Ni gradient however decreases after the $2^{nd}$ heat treatment. In view of the electrochemical properties, these results indicate that a higher Ni content on the surface provides a lower IRRQ. Table 6.1 gives the average composition in each point of detection in pEX, EX1.7, pCEX2, and CEX2.2.

TABLE 6.1

Ni molar ratios from the EDS profiles

| Example ID | Ni/(Ni + Mn + Co) (mol/mol) | | | | | MR(SC-Ni)* |
|---|---|---|---|---|---|---|
| | Ni(1) | Ni(2) | Ni(3) | Ni(4) | Ni(5) | |
| pEX1 | 0.655 | 0.601 | 0.545 | 0.610 | 0.655 | 1.202 |
| EX1.7 | 0.626 | 0.611 | 0.598 | 0.610 | 0.625 | 1.046 |
| pCEX2 | 0.630 | 0.629 | 0.696 | 0.613 | 0.624 | 0.901 |
| CEX2.2 | 0.621 | 0.618 | 0.635 | 0.618 | 0.624 | 0.980 |

*MR(SC-Ni) = Normalized Ni molar ratio of the surface to the center

The normalized Ni/M' molar ratio (MR(SC—Ni)) of the surface part is obtained by dividing the values measured at the surface by the Ni/M' ratio of the center part using the formula: MR(SC—Ni)=(Ni(1)+Ni(5))/(2*Ni(3)). The normalized result in Table 6.1 is thus an average value of the surface part (Ni(1) and Ni(5)). For example, EX1.7 has Ni(1), Ni(3), and Ni(5) of 0.626, 0.598, and 0.625, respectively. The normalized Ni/M' ratio (MR(SC—Ni)) is measured as follows:

$$MR(SC\text{-Ni}) = \frac{(0.626 \text{ of Ni}(1)/0.598 \text{ of Ni}(3) + 0.625 \text{ of Ni}(5)/0.598 \text{ of Ni}(3))}{2} = 1.046$$

The Table shows that NMC compounds having a normalized Ni/M' molar ratio in the range of 1.04 to 1.25 or preferably 1.04 to 1.10, have an enhanced battery performance, such as higher capacity and lower irreversibility.

In a similar way the Co molar ratios were measured, and reported in Table 6.2. Different from the gradient in Ni content, there is nearly no positive Co gradient (with a higher Co content in the particle core), which can be expressed by 1.00≤MR(SC—Co)≤1.030.

TABLE 6.2

Co molar ratios from the EDS profiles

| Example ID | Co/(Ni + Mn + Co) (mol/mol) | | | | | MR(SC-Co) |
|---|---|---|---|---|---|---|
| | Co(1) | Co(2) | Co(3) | Co(4) | Co(5) | |
| pEX1 | 0.199 | 0.207 | 0.207 | 0.209 | 0.201 | 0.966 |
| EX1.7 | 0.203 | 0.197 | 0.201 | 0.198 | 0.205 | 1.015 |
| pCEX2 | 0.202 | 0.206 | 0.177 | 0.213 | 0.201 | 1.138 |
| CEX2.2 | 0.200 | 0.202 | 0.211 | 0.202 | 0.203 | 0.955 |

Example 2 and Comparative Example 3

An NMC powder having the formula $Li_{0.995}M'_{1.005}O_2$ with $M'=Ni_{0.4}(Ni_{0.5}Mn_{0.5})_{0.4}Co_{0.2}$ is manufactured by the same method as in EX1.1 but using a precursor $Ni_{0.4}(Ni_{0.5}Mn_{0.5})_{0.4}Co_{0.2}O_{0.17}(OH)_{1.83}$ having the same type of Ni gradient as pEX. In the $2^{nd}$ blending and sintering process, the Li stoichiometry is 0.99 and the sintering temperature is 780° C. The final product is labeled EX2. CEX3 is prepared using the same method as in EX2, except that the 2nd sintering temperature is 840° C., which is the normal sintering temperature for an NMC 622 compound, as is discussed for example in Example 1 of WO2018/158078A1. The crystallite size and electrochemical performance of EX2 and CEX3 are evaluated by the same method as in Example 1. The crystallite sizes, initial discharge capacities, and irreversible capacities of EX2 and CEX3 are shown in Table 7.

TABLE 7

Properties of Example 2 and Explanatory Example 3

| Example ID | Li/M' | $2^{nd}$ sintering T (° C.) | Crystallite size (nm) | DQ1 (mAh/g) | IRRQ (%) |
|---|---|---|---|---|---|
| EX2 | 0.99 | 780 | 27.3 | 185.1 | 5.9 |
| CEX3 | 0.99 | 840 | 36.7 | 180.8 | 9.3 |
| EX1.5 | 0.99 | 790 | 29.0 | 190.2 | 4.9 |

The NMC compound (EX2) having the crystallite size less than 33 nm delivers a better electrochemical performance such as a higher discharge capacity (>185 mAh/g) and lower irreversibility (<6.0%). EX1.5 has been added to compare the composition of Examples 1 and 2, and it shows the composition of EX1.5 ($Li_{0.995}M'_{1.005}O_2$ with $M'=Ni_{0.45}(Ni_{0.5}Mn_{0.5})_{0.35}Co_{0.20}$) yields even better results than EX2 ($Li_{0.995}M'_{1.005}O_2$ with $M'=Ni_{0.4}(Ni_{0.5}Mn_{0.5})_{0.4}Co_{0.2}$).

Explanatory Example 1

To investigate the effect on surface impurities of process conditions such as the lithium source and atmosphere, an NMC powder having the formula $Li_{0.024}M'_{0.976}O_2$ with $M'=Ni_{0.4}(Ni_{0.5}Mn_{0.5})_{0.4}Co_{0.2}$ is manufactured by the same method as in EX2 but using a precursor $M'O_{0.23}(OH)_{1.77}$ with $M'=Ni_{0.4}(Ni_{0.5}Mn_{0.5})_{0.4}Co_{0.2}$ having a Ni gradient according to the invention. The Li stoichiometry of the $1^{st}$ blending and the $1^{st}$ sintering temperature are 0.80 and 800° C., respectively. At that time, $Li_2CO_3$ is used as a lithium source for the $1^{st}$ blending, as is described in WO2017/042654. In the $2^{nd}$ blending and sintering process, the target Li stoichiometry is 1.05 and the sintering temperature is 855 C. All preparation process, in this example, take place under dry atmosphere. The final product is labeled EEX1. The carbon content of EEX1 and EX2—which is indicator for surface impurities like $Li_2CO_3$— are measured by method F). EEX1 prepared using $Li_2CO_3$ as the $1^{st}$ lithium source under dry atmosphere has a carbon content of 970 ppm, whereas EX2 has a carbon content of 82 ppm. Therefore, it is preferable to choose LiOH as lithium source and a low sintering temperature to reduce surface impurities on the final positive electrode active materials.

Comparative Example 4

An NMC powder, having the formula $Li_{0.990}M'_{1.010}O_2$ with $M'=Ni_{0.55}(Ni_{1/2}Mn_{1/2})_{0.3}Co_{0.15}$ is manufactured by the same method as in EX1.1 but using a precursor $M'O_{0.35}(OH)_{1.65}$ with $M'=Ni_{0.55}(Ni_{1/2}Mn_{1/2})_{0.3}Co_{0.15}$ having a Ni gradient according to the invention. In the $2^{nd}$ blending and sintering process, the target Li stoichiometry is 0.98 and the sintering temperature is 720° C. The final product is labeled CEX4.1. CEX4.2 and CEX4.2 are prepared using the same method as in CEX4.1, their target Li stoichiometry and $2^{nd}$ sintering temperature are shown in Table 8. The crystallite size and electrochemical performance of CEX4.1 to CEX4.3 are evaluated by the same method as in Example 1, and are shown in Table 8. The results of EX1.3 are added for reference.

TABLE 8

Properties of Comparative Example 4

| Example ID | Li/M' | $2^{nd}$ sintering T (° C.) | Crystallite size (nm) | DQ1 (mAh/g) | IRRQ (%) |
|---|---|---|---|---|---|
| CEX4.1 | 0.98 | 730 | 25.4 | 182.6 | 11.5 |
| CEX4.2 | 0.98 | 760 | 27.5 | 185.5 | 10.7 |
| CEX4.3 | 0.98 | 820 | 34.8 | 186.9 | 11.4 |
| EX1.3 | 0.98 | 780 | 26.7 | 187.2 | 5.9 |

It shows that, even though MMC compounds in Comparative Example 4 have a crystallite size less than 33 nm, they have bad electrochemical characteristics, such as low discharge capacities and high irreversibility. Therefore, NMC compounds with Ni-excess of 0.55 or more do not exhibit good electrochemical properties, although they have the optimal crystallite sizes that could contribute to an enhanced battery performance.

The invention claimed is:

1. A powderous positive electrode material for lithium ion batteries, comprising crystalline lithium transition metal-based oxide particles having a general formula $Li_{1+a}((Ni_z(Ni_{0.5}Mn_{0.5})_y Co_x)_{1-k} A_k)_{1-a}O_2$, wherein A is a dopant, $-0.030 \leq a \leq 0.025$, $0.10 \leq x \leq 0.40$, $0.25 \leq z \leq 0.52$, $x+y+z=1$ and $k \leq 0.01$, wherein the crystalline powder has a crystallite size less than 33 nm as determined by the Scherrer equation based on the peak of the (104) plane obtained from the X-ray diffraction pattern using a CuKα radiation source, and wherein MR(SC—Ni) is between 1.04 and 1.10, MR(SC—Ni) being a normalized molar ratio MR(Ni) of a particle, wherein EDS analysis is performed at sample locations having the same volume and being located along an EDS scan line crossing a center of the particle on a cross-section of the particle, wherein a first sample location (D1) is at a surface of a first particle edge, a second sample location (D3) is at a center of the particle, and a third sample location (D5) is at a surface of a second particle edge, opposite the first particle edge, and wherein MR(SC—Ni) is obtained by dividing the sum of the value of MR(Ni) measured in a volume at the first sample location and the value of MR(Ni) measured in a volume at the third sample location, by two times the value of MR(Ni) measured in a volume at the second sample location.

2. The powderous positive electrode material of claim 1, wherein $0.18 \leq x \leq 0.22$, $0.42 \leq z \leq 0.52$ and $1.075 < z/y < 1.625$.

3. The powderous positive electrode material of claim 1, having a crystallite size between 25.0 and 30.5 nm.

4. The powderous positive electrode material of claim 1, having a carbon content ≤400 ppm.

5. The powderous positive electrode material of claim 1, comprising particles having a coating comprising a $LiNaSO_4$ secondary phase, wherein the $LiNaSO_4$ secondary phase is present in a content between 0.15 and 5 wt % with respect to the total weight of the powder and the secondary phase further comprises up to 1 wt % of one or more of $Al_2O_3$, $LiAlO_2$, LiF, $Li_3PO_4$, MgO or $Li_2TiO_3$.

6. The powderous positive electrode material of claim 1, wherein the dopant A is selected from the group consisting of one or more of Al, Ca, W, B, Si, Ti, Mg and Zr.

7. The powderous positive electrode material of claim 1, wherein the powder has a particle size distribution with a D50 of 8 to 12 μm.

8. A method for preparing the powderous positive electrode material of claim 1, the method comprising the steps of:
    providing a M'-based precursor prepared from the co-precipitation of metal salts with a base; wherein the M'-based precursor comprises particles having a molar ratio MR(Ni) of Ni versus the total transition metal content in a cross section of a particle that is higher in a surface area than in a center area of the particle, as determined by EDS analysis,
    mixing the M'-based precursor with one of LiOH, $Li_2O$ or $LiOH \cdot H_2O$, thereby obtaining a first mixture, whereby the Li to transition metal ratio in the first mixture is between 0.65 and 0.97,
    sintering the first mixture in an oxidizing atmosphere in a rotary kiln at a temperature between 650 and 850° C., for a time between ⅓ and 3 hrs, thereby obtaining a lithium deficient precursor powder,
    mixing the lithium deficient precursor powder with one of LiOH, $Li_2O$ or $LiOH \cdot H_2O$, thereby obtaining a second mixture, and
    sintering the second mixture in an oxidizing atmosphere at a temperature between 750 and 800° C., for a time between 6 and 36 hrs.

9. The method according to claim 8, wherein the M'-based precursor has a particle size distribution with a D50 of 10 to 15 μm.

* * * * *